United States Patent Office 3,741,856
Patented June 26, 1973

3,741,856
NOVEL SEALANTS AND ADHESIVES
John Hurst, London, England, assignor to W. R. Grace
& Co., New York, N.Y.
No Drawing. Continuation-in-part of application Ser. No.
676,652, Oct. 19, 1967. This application Feb. 28, 1969,
Ser. No. 803,438
Claims priority, application Great Britain, Oct. 21, 1966,
47,419/66
Int. Cl. B32b 11/02
U.S. Cl. 161—88
3 Claims

ABSTRACT OF THE DISCLOSURE

Novel structures suitable for the formation of waterproof and/or adhesive layers on surfaces, particularly of concrete, the structures comprising a sheet-like substrate and contiguous thereto a membrane of a waterproofing pressure-sensitive adhesive. The substrate may be a sheet-like support having the membrane adherent thereto or be in the form of a protective coating which can be physically removed from the membrane without substantial damage thereto. If desired, the structures may be in the form of a roll comprising alternate layers of the membrane and sheet-like substrate, one face thereof being substantially more readily physically separable from the membrane than the other face.

---

This application is a continuation-in-part application of copending application, Ser. No. 676,652, filed Oct. 19, 1967.

The invention relates to novel sealants and adhesives in the form of pre-formed sheet-like structures. The novel structures of the invention are particularly useful for application to concrete surfaces and will be described herein chiefly by reference to such use. It is to be understood, however, that the same description applies, mutatis mutandis, to the sealing of other surfaces, particularly such as are found in buildings and civil engineering structures.

It is known to seal surfaces, particularly of concrete, by forming thereon a membrane of a bituminous composition or the like which is substantially impermeable to moisture and water vapour. (The term "bituminous composition" is used in this specification to include compositions containing asphalt, tar or pitch.) It is also known that such a composition may form an adhesive for a layer of cladding material, e.g. tiles and panels of linoleum, polyvinyl chloride, thermoplastic material, natural or reconstituted stone or cork, and wood block and wood strip flooring. In the past such membranes have been formed by the application in situ or hot liquid bitumen, tar or pitch or a cold solution or emulsion of bitumen, tar or pitch. If desired, the membrane may be reinforced with latex, asbestos fibers or other types of filler. It is also known to provide a waterproofing membrane by the use of films of polyethylene or synthetic or natural rubber, or of bituminous roofing felt.

These known methods suffer from serious disadvantages. Thus in general the known procedures require formation of the layer of sealant in situ with the consequent difficulties in ensuring a uniform layer and the expense of labor at the site. Furthermore, where the surface is a concrete floor which is subject to rising moisture, the adhesive must form a water-impermeable and alkali-resistant membrane; in practice this means that a bituminous composition must be applied hot to the floor, which is highly inconvenient, or a solvent-based bituminous composition must be used, which is expensive and involves fire risk. Generally the adhesive compositions currently in use require, in order to permit evaporation of solvent or aqueous content, to be placed in position some time before the cladding material is applied if a satisfactory bond is to be obtained, and this again is inconvenient.

It is also known to provide the rear surface of cladding materials, particularly floor tiles, with a layer of a contact adhesive covered by a protective sheet which is removed before placing the cladding material in position. However, it is not possible to provide a satisfactory water- and alkali-resistant continuous coating under the cladding material by this means, particularly on a typical rough dusty concrete surfce.

It has now been realised that considerable advantages are obtained from the use of pre-formed membranes of waterproofing (pressure-sensitive) adhesive. Such membranes can be produced on a large scale in a factory and then used on site. In one aspect, therefore, the invention provides a novel structure comprising a sheet-like substrate and contiguous thereto a membrane of a waterproofing (pressure-sensitive) adhesives. Such mem- The membrane can be a layer of the adhesive alone or the adhesive can contain reinforcing material, particularly to give the membrane mechanical strength; if desired, the membrane can contain a plurality of layers of waterproofing pressure-sensitive adhesive (the adhesive being the same or different in the different layers), and the layers can be separated by reinforcing material in the form of a sheet.

The novel structures of the invention can be divided into two broad types. The structures of the first type are those designed to provide a continuous waterproof membrane adherent to a surface, the outer surface of the membrane having a non-adhesive surface. The structures of the second type are those designed to provide on a surface a layer of a pressure-sensitive contact adhesive, either over the whole of the surface, thus simultaneously providing a continuous waterproof membrane, or over selected parts of the surface only.

In the structures of the first type, the substrate is a sheet-like support (e.g. a film of an organic polymer such as polyethylene, as explained in detail below) to which the membrane is adherent (that is to say the support and the membrane remain adherent to each other when the structure is used), and the surface of the support remote from the membrane is non-adhesive. In the structures of the second type the substrate is a protective coating (e.g. siliconized paper or like materials as explained in detail below) which can be physically removed from the membrane without substantial damage to the membrane. It will of course be clear that for storage purposes the surface of the membrane remote from the substrate must have a said protective coating thereon. Thus the novel structures of the invention as produced in the factory, stored and brought to the site are in the form of laminates of the protective coating, the membrane and either a sheet-like support (the first type) or a second protective coating (the second type). The structures are conveniently available in the form of rolls.

It has been realised that in rolls of the structures as produced in the factory, stored and brought to the site, it is possible for the said protective coating on the face of the membrane, which face is to be applied to the surface to be sealed and/or provided with a layer of contact adhesive, to be provided by the substrate itself, if the substrate is such that when the roll of the structure is enrolled, the substrate is physically separated from the said face of the membrane without substantial damage to the membrane. Thus the invention also provides the structures in the form of a roll comprising alternate layers of a membrane of waterproofing pressure-sensitive adhesive and a sheet-like substrate, one face of the substrate being substantially more readily physically separable from the membrane than the other face.

Such rolls can be prepared by forming a substrate, one face of which is substantially more readily separable from the pressure-sensitive adhesive than the other face, preparing a laminate of the substrate and a membrane of the pressure-sensitive adhesive with the said other face contiguous thereto, and rolling up the laminate. The said more readily separable face can be rendered more readily separable before, during or after the lamination with the membrane.

In structures of the first type described above the differential separability of the two faces of the sheet-like support can readily be obtained by forming a release coating on one face only of the support; preferably the release coating is on the outer surface of the rolled-up support. The release coating can be formed in known manner, for example by deposition of a silicone, such as by the application to the membrane of a dispersion of a silicone compound which is cured with the aid of a catalyst and/ or heat and forced ventilation.

In structures of the second type, where the substrate is a protective coating which is ultimately removed altogether from the membrane, a release coating is formed on each side of the substrate, e.g. as described above, but coatings with different levels of release properties are of course required in order to obtain the desired differential separability. Preferably the outer face of the rolled-up protective coating is more readily separable from the layer of adhesive than is the inner face of the protective coating.

The widths of the novel structures will vary widely, e.g. from 1 to 48 inches (2.5 to 120 cm.) and even more, depending on the use to which they are to be put; generally they will be at least 2 inches (5 cm.) wide, e.g. 6 to 36 inches (15 to 90 cm.) wide, with widths in the upper part of this range, e.g. 24 to 36 inches (60 to 90 cm.), being preferred where the whole of a surface is to be rendered waterproof. The thickness of the novel structures can also vary widely depending on the intended end use, but will generally be from 0.01 to 0.25 or 0.35 inch (0.025 to 0.6 or 0.9 cm.).

A variety of adhesives can be used successfully for the membrane, but the adhesive must be such that the membrane will stick to the required surface without the use of heat or additional bonding agents; thus for application to surfaces of concrete, which are comparatively rough and dusty, the layer of adhesive must be at least 0.01 inch (0.025 cm.) thick, preferably 0.025 to 0.2 inch (0.063 to 0.5 cm.); the thicker the layer of adhesive, the better the waterproofing effect, but in general a layer 0.025 to 0.15 inch (0.063 to 0.4 cm.) is satisfactory, with thicknesses at the upper end of this range being preferred. Thus for structures of the first type a support having on it a single layer of adhesive 0.09 to 0.13 inch (0.23 to 0.33 cm.) thick is preferred; this may be achieved for example by two layers of adhesive, each 0.04 to 0.07 inch (0.1 to 0.18 cm.) thick, either side of a central reinforcing material.

Bituminous adhesives are generally suitable except where their color is a disadvantage. If a bituminous adhesive is used, it is preferably formed of natural or synthetic rubber, virgin or reclaimed, blended into bitumen to provide a smooth mix. The ratio by weight of bitumen to rubber is suitably greater than 80:20, preferably up to 95:5, especially about 90:10. Other types of contact adhesive composition may include polychloroprene, butyl rubber, oil-based mastics or compositions containing rosins or rosin derivatives. Generally, suitable compositions have softening points (measured by the Ring and Ball method) of 60° to 140°, preferably 60° to 110° C. and penetration values of 50 to 400, preferably 150 to 300 at 25° C. (100 g. 5 secs.—I.P. method).

A wide variety of materials can be used to provide protective coatings in the novel structures of the invention. Paper having a release coating thereon, e.g. siliconized paper or suitable material formulated from or with polytetrafluoroethylene, is satisfactory. Other materials include treated or modified films of organic polymers.

A wide variety of materials can be used as the sheet-like support, which forms parts of the novel structures of the first type noted above, and it is a particular advantage of such structures that they can be used to provide a waterproof seal over a surface which combines the properties of the membrane and the support. It is generally desirable that the support should be substantially impermeable to water. For many purposes it is desirable that the support should be such that after application to the surface it is capable of stretching with movement of the concrete or other material, e.g. as a result of shrinkage, with maintenance of a moisture and moisture-vapor-proof seal. To this end it is desirable that the combined structure of the support and the membrane should have, at 20° C., an elongation at break of at least 300%, a tensile strength of at least 100 lb. per foot width (at least 1.5 kg. per cm. width) and an Elmendorf tear strength of at least 750 gm. However, where stretchability and flexibility are less important than other properties, supports not fulfilling these requirements can be utilized. For example it is desirable for some purposes to use a metallic foil, particularly of copper or aluminum, as the support.

The preferred supports are films of natural rubber or of a synthetic organic polymer such as polyethylene, which is preferred, e.g. that commercially available under the trade name Polythene, polypropylene or other polyolefin, a polyamide, a polyester, e.g. polyethylene terepthalate, a polyurethane, polyvinyl chloride, a copolymer of vinyl chloride and vinylidene chloride, a synthetic rubber such as polychloroprene or butyl rubber, regenerated cellulose, cellulose ethers or cellulose esters. Inorganic or metallic supports can also be used.

Particularly for use in road-building it is desirable that the support should be such that hot asphalt can be poured directly onto it without deleterious effect on the waterproof seal. For this purpose the support should be able to resist a temperature of at least 150° C., preferably at least 175° C., for asphalt mixes such as sand course asphalt, and even higher temperatures for hot asphalt (mastic), which is applied at temperatures up to 250° C. A particularly suitable material for this purpose is one consisting of a woven fabric of polypropylene fibers having on one side a waterproof layer of a pressure-sensitive bitumen-rubber adhesive as described above and on the other side a waterproof layer of a bitumen adhesive which is not a pressure-sensitive adhesive when cold but becomes tacky at elevated temperature, as when a hot asphalt mix is poured thereon.

While cellular films can be used as supports, the supports are generally substantially incompressible and have a thickness of at most 0.25 inch (0.6 cm.).

Other sheet-like supports include woven and non-woven fabrics of inorganic or organic natural or synthetic fibers (i.e. staple fibers or continuous filaments), e.g. a woven fabric of fibers of one of the synthetic organic polymers already referred to, glass tissue, hessian, cotton or other fiber scrim or bituminous roofing felt.

If desired, the surface of the support remote from the membrane can be treated to protect it from damage and/or so that it offers an improved keying surface for other material, e.g. concrete, subsequently applied thereto. Thus this surface of the support can be textured and/or can carry a layer of adhesive, which is preferably water-resistant and may be the same as or different from the adhesive in the membrane, to which layer is adherent a deposit of granular or powdered material, e.g. finely divided aggregate or other organic or inorganic material, e.g. sand or cork granules.

As noted above, the novel structures containing a sheet-like support are used to provide a waterproof membrane over a surface, particularly a concrete surface, by applying the exposed face of the membrane to the surface, a plurality of overlapping structures being used if necessary in order to form a continuous membrane over the whole surface. After the structure has thus been applied it is usual to form or place another surface adjacent thereto, e.g. another mass of concrete, a sand or cement screed or other floor finish, a layer of asphalt or a cladding material.

Also as noted above, the preformed membranes having protective coatings on both faces thereof are particularly valuable for the easy and expeditious securing of cladding materials to surfaces, particularly concrete. Accordingly in another aspect this invention provides a process for securing cladding material to a surface which comprises (a) removing the protective coating from one face of the preformed membrane, (b) applying the thus-exposed face of the membrane to the surface, (c) removing the protective coating from the other surface of the membrane and (d) applying the cladding material to the said other face of the membrane.

While the above process is of most value in cladding of floors, it is equally applicable to the cladding of walls and ceilings. The nature of the cladding material is not critical and any of the cladding materials mentioned hereinbefore, and also ceiling tiles, e.g. of polystyrene, may be used.

The novel structures of the invention can be prepared without difficulty by techniques known per se. It is preferred to use adhesives which are not solvent-based and are thus applied hot. Thus the adhesive may be applied hot, with aid of a suitable device to ensure a uniform layer, to the substrate. If it is desired to incorporate a sheet-like reinforcing layer in the membrane, this can be achieved, for example by pressing a scrim into the layer of adhesive. Such a reinforcing layer is not generally required when a support is used, but is often helpful when there is no support in order to prevent excessive distortion of the membrane when the protective coatings are removed.

The novel structures can be used in accordance with the invention by applying an exposed face of the membrane to the surface to be sealed and/or provided with a layer of contact adhesive; in the latter case the protective coating is removed at an appropriate stage to expose the other surface of the membrane ready for the application thereto of cladding material. If necessary the formation of a continuous waterproof seal over the whole surface is achieved by further applications so that each membrane overlaps its neighbor.

When the rolls are used, they are simply unrolled, thus exposing one surface of the membrane, which surface is applied to the surface to be sealed and/or provided with a layer of contact adhesive; in the latter case the protective coating is removed at an appropriate stage to expose the other surface of the membrane ready for the application thereto of cladding material. If necessary the formation of a continuous waterproof seal over the whole surface is achieved by further applications so that each membrane overlaps its neighbor.

The following examples illustrate the invention.

EXAMPLE 1

A structure according to the invention was made by coating each face of a film of polyethylene (Polythene) 12 inches (30 cm.) wide and 0.005 inch (0.013 cm.) thick with a coating 0.125 inch (0.3 cm.) thick of a bituminous adhesive consisting of 7 parts by weight natural rubber and 93 parts by weight oxidized bitumen, and depositing finely divided silica sand on one of the coatings. The structure was placed over a concrete floor base with the face having the silica sand deposit thereon uppermost and a concrete floor screed of sand and cement was then applied. A moisture and moisture-vapor-proof seal between the floor base and screed was thus obtained.

EXAMPLE 2

A second structure was made by coating one face of a polyethylene film as used in Example 1 with a coating 0.125 inch (0.3 cm.) thick of the bituminous adhesive used in Example 1.

One such structure was placed over a concrete floor base with the adhesive-coated face adjacent to the concrete; a floor screed of sand and cement was then applied. A moisture and moisture-vapor-proof seal between the floor base and screed was thus obtained.

A second such structure was placed over a concrete roof, with the adhesive-coated face adjacent to the concrete. Earth was then filled in over the roof. A moisture and moisture-vapor-proof seal between the roof and the earth was thus obtained.

What is claimed is:

1. In combination (a) structure comprising a flexible sheet-like support, on one side of the support a layer of a waterproof bituminous composition which is not a pressure-sensitive adhesive when cold but which becomes tacky at an elevated temperature; and on the other side of the support a waterproof pressure-sensitive adhesive membrane formed of a bituminous rubber composition at least 0.025 cm. thick which is a blend of a rubber selected from the class consisting of a natural rubber, synthetic rubber, or combinations thereof, a bitumen, the ratio by weight of said bitumen to said rubber being greater than 80:20, and (b) a concrete surface to which the face of said pressure-sensitive adhesive membrane is adherent.

2. A structure according to claim 1 wherein the support is a woven fabric of polypropylene fibers.

3. A structure according to claim 1 further comprising a layer of load-bearing hot poured asphalt aggregate deposited over the layer of bituminous composition which is not a pressure-sensitive adhesive.

References Cited

UNITED STATES PATENTS

| | | | |
|---|---|---|---|
| 2,771,745 | 11/1956 | Bramble | 161—238 X |
| 2,828,798 | 4/1958 | Hopkins et al. | 161—406 X |
| 2,972,558 | 2/1961 | Bramble | 161—406 X |
| 3,075,640 | 1/1963 | Snyder | 206—56 |
| 3,388,723 | 6/1968 | McNulty | 161—76 X |

FOREIGN PATENTS

| | | | |
|---|---|---|---|
| 249,629 | 2/1964 | Australia | 161—236 |
| 699,950 | 12/1964 | Canada | 161—236 |

GEORGE F. LESMES, Primary Examiner

W. R. DIXON, Jr., Assistant Examiner

U.S. Cl. X.R.

161—92, 93, 151, 167, 236; 94—9, 18, 20